United States Patent
Yokoyama et al.

(10) Patent No.: US 11,234,114 B2
(45) Date of Patent: Jan. 25, 2022

(54) DEVICE OPERATION CONTROLLER, DEVICE OPERATION CONTROL METHOD, AND COMPUTER PROGRAM

(71) Applicant: JVCKENWOOD Corporation, Yokohama (JP)

(72) Inventors: Hiroaki Yokoyama, Yokohama (JP); Takafumi Sekine, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/968,665

(22) PCT Filed: Feb. 4, 2019

(86) PCT No.: PCT/JP2019/003816
§ 371 (c)(1),
(2) Date: Aug. 10, 2020

(87) PCT Pub. No.: WO2019/156016
PCT Pub. Date: Aug. 15, 2019

(65) Prior Publication Data
US 2020/0413242 A1 Dec. 31, 2020

(30) Foreign Application Priority Data
Feb. 9, 2018 (JP) .............................. JP2018-022161

(51) Int. Cl.
*H04W 4/48* (2018.01)
*H04W 8/06* (2009.01)

(52) U.S. Cl.
CPC .............. *H04W 8/06* (2013.01); *H04W 4/48* (2018.02)

(58) Field of Classification Search
CPC ........... H04W 4/08; H04W 4/40; H04W 4/48; H04W 4/80; H04W 8/06; H04W 8/186;
(Continued)

(56) References Cited

U.S. PATENT DOCUMENTS 9,462,417 B2 * 10/2016 Fujiwara ............... H04W 12/06
9,836,892 B1 * 12/2017 Nishiyama ............... G07C 1/32
(Continued)

FOREIGN PATENT DOCUMENTS

JP 2005226284 A 8/2005
JP 2016076899 A 5/2016
(Continued)

OTHER PUBLICATIONS

International Search Report for International Application No. PCT/JP2019/003816; dated Apr. 2, 2019.

*Primary Examiner* — Nathan S Taylor
(74) *Attorney, Agent, or Firm* — Cantor Colburn LLP (57) ABSTRACT

This device operation controller is provided with: a wireless receiver that receives information including the ID of a portable device, the ID being wirelessly transmitted from the portable device; a first registration processing unit that registers, as the ID of a portable device belonging to an owner group, a first ID received by the wireless receiver by a predetermined procedure; a second registration processing unit that, when a second ID, together with the ID of the portable device belonging to the owner group and registered by the first registration processing unit, has been received by the wireless receiver, registers the second ID as the ID of a portable device belonging to a concerned person group; and a notification unit that notifies a device to be operated that an operation on the device is permitted on condition that either the ID of the portable device belonging to the owner group and registered by the first registration processing unit or the ID of the portable device belonging to the concerned person group and registered by the second registration processing unit is received at that point in time.

6 Claims, 7 Drawing Sheets

(58) Field of Classification Search
CPC ...... H04W 48/04; H04W 84/10; B60R 25/24;
E05B 49/00; H04M 11/00; H04M 1/00;
H04Q 9/00
See application file for complete search history.

(56) References Cited

U.S. PATENT DOCUMENTS

| | | | |
|---|---|---|---|
| 2002/0177472 A1* | 11/2002 | Tomoda | H04M 1/6091 |
| | | | 455/569.2 |
| 2007/0205862 A1* | 9/2007 | Brilion | G07C 9/00309 |
| | | | 340/5.72 |
| 2016/0231421 A1* | 8/2016 | Murakami | B60R 25/245 |
| 2017/0111766 A1* | 4/2017 | Muramatsu | H04W 64/00 |
| 2020/0169842 A1* | 5/2020 | Yamaguchi | H04W 4/40 |
| 2021/0001809 A1* | 1/2021 | Sekine | E05B 49/00 |

FOREIGN PATENT DOCUMENTS

| | | |
|---|---|---|
| JP | 2016204912 A | 12/2016 |
| JP | 2017001615 A | 1/2017 |

* cited by examiner

FIG. 1

| DEVICE-SPECIFIC ID | GROUP | NUMBER OF TIMES ID EXTRACTED |
|---|---|---|
| AAAAA | OWNER | — |
| BBBBB | CONCERNED PERSON | 52 |
| CCCCC | CONCERNED PERSON | 38 |
| DDDDD | CONCERNED PERSON | 18 |
| FFFFF | — | 9 |
| GGGGG | — | 2 |
| HHHHH | — | 1 |
| . . . | | |

FIG. 2

| GROUP | VEHICLE CONTROL | | | | | | |
|---|---|---|---|---|---|---|---|
| | DOOR LOCK/ UNLOCK | HFP PRIORITY CONNECTION | HFP CONNECTION | PHONE BOOK DOWNLOAD | NAVIGATION | A2DP CONNECTION | ... |
| OWNER | PERMITTED | PERMITTED | PERMITTED | PERMITTED | PERMITTED | PERMITTED | |
| CONCERNED PERSON | PERMITTED | NOT PERMITTED | PERMITTED | NOT PERMITTED | PERMITTED | PERMITTED | |
| NOT REGISTERED | NOT PERMITTED | NOT PERMITTED | PERMITTED | NOT PERMITTED | NOT PERMITTED | PERMITTED | |

FIG. 3

| DEVICE UNIQUE ID | GROUP | NUMBER OF TIMES ID ACQUIRED | VEHICLE CONTROL | | | | | | |
|---|---|---|---|---|---|---|---|---|---|
| | | | DOOR LOCK/UNLOCK | HFP PRIORITY CONNECTION | HFP CONNECTION | PHONE BOOK DOWNLOAD | NAVIGATION | A2DP CONNECTION | ... |
| AAAAA | OWNER | — | PERMITTED | PERMITTED | PERMITTED | PERMITTED | PERMITTED | PERMITTED | |
| BBBBB | CONCERNED PERSON | 52 | PERMITTED | NOT PERMITTED | PERMITTED | NOT PERMITTED | PERMITTED | PERMITTED | |
| CCCCC | CONCERNED PERSON | 38 | PERMITTED | NOT PERMITTED | PERMITTED | NOT PERMITTED | NOT PERMITTED | PERMITTED | |
| DDDDD | CONCERNED PERSON | 18 | PERMITTED | NOT PERMITTED | NOT PERMITTED | NOT PERMITTED | NOT PERMITTED | PERMITTED | |
| FFFFF | — | 9 | NOT PERMITTED | NOT PERMITTED | NOT PERMITTED | NOT PERMITTED | NOT PERMITTED | NOT PERMITTED | |
| GGGGG | — | 2 | NOT PERMITTED | NOT PERMITTED | NOT PERMITTED | NOT PERMITTED | NOT PERMITTED | NOT PERMITTED | |
| HHHHH | — | 1 | NOT PERMITTED | NOT PERMITTED | NOT PERMITTED | NOT PERMITTED | NOT PERMITTED | NOT PERMITTED | |
| ... | | | | | | | | | |

DEVICE OPERATION CONTROLLER, DEVICE OPERATION CONTROL METHOD, AND COMPUTER PROGRAM

CROSS REFERENCE TO RELATED APPLICATIONS

This is the U.S. national stage of application No. PCT/JP2019/003816, filed on Feb. 4, 2019. Priority under 35 U.S.C. § 119(a) and 35 U.S.C. § 365(b) is claimed from Japanese Application No. 2018-022161, filed Feb. 9, 2018, the disclosure of which is also incorporated herein by reference.

TECHNICAL FIELD

The present invention relates to a vehicle antitheft device, a vehicle antitheft method, and a computer program. The present invention is particularly suitable for operating a vehicle, but can be similarly used when operating a device other than the vehicle. In the following description, a case where the vehicle is operated and controlled will be mainly described as an example.

BACKGROUND ART

In a vehicle such as a passenger car for example, a so-called keyless entry system is widely used in which the door can be unlocked or locked by remote control without inserting the key into the keyhole. Such a keyless entry system is a system in which an ID code is transmitted to a door lock control unit when a user operates a switch of a small transmitter that is integrated with an ignition key or a separate body and unlocks or locks the door when the ID is accepted.

It is also known so-called smart entry system in which the door can be unlocked automatically without operating the key when a user with the key in a bag, pocket, etc. approaches the vehicle, and locked automatically when the user leaves the vehicle.

In addition, it is also known that a vehicle can be performed operation control of a vehicle by a communication terminal held by each of a plurality of persons (see, for example, PTL 1).

In the disclosure of PTL 1, it is possible to control the operation of the vehicle such as locking/unlocking the door lock and starting/stopping the engine by using a device paired with this system in advance. The pairing performed in advance in this system is realized by the system storing identification information of a pairing target device, for example, information based on a unique ID and an encryption key. The unique identification information given to the device is used to specify the device to be paired. For example, in the case of a configuration that uses short-range wireless communication for communicating, a unique ID written in advance in the NFC (Near Field Communication) or FeliCa chip can be used. In this system, since a plurality of devices can be paired, a plurality of people can unlock the door lock.

CITATION LIST

Patent Literature

[PTL 1] JP 016-076899 A

SUMMARY OF INVENTION

Technical Problem

However, in the keyless entry system and the smart entry system, only the user who owns the small transmitter of the keyless entry system or the portable device of the smart entry system can unlock or lock the door. When a plurality of users use the same vehicle, all users need to have a small transmitter of the keyless entry system or a portable device of the smart entry system.

This is also the case with the disclosure of PTL 1 in that the operation control of the vehicle can be performed only by the user who has a device that has been paired with this system in advance. When a plurality of users use the same vehicle, it is a very complicated work to perform the pairing process for all the users in advance.

Therefore, the object of the present invention is to solve the above-mentioned problems to provide a device operation controller, device operation control method, and computer program thereof, which can easily control an device, such as a vehicles, even if the device is to be used by a plurality of users.

Solution to Problem

In order to solve the above-mentioned problems, according to a first aspect of the present invention, it is provided a device operation controller comprising: a radio receiver for receiving information including an ID of a mobile device wirelessly transmitted from the mobile device; a first registration processing unit for registering a first ID received by the radio receiver in a predetermined procedure as an ID of a mobile device belonging to an owner group; a second registration processing unit for registering a second ID received by the radio receiver together with the ID of the mobile device belonging to the owner group registered in the first registration processing unit as an ID of a mobile device belonging to a concerned person group; and an operation target cooperation unit for executing an operation permission notification process to notify an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit.

According to a second aspect of the present invention, it is provided a device operation control method including steps of: registering IDs each included in information transmitted from a predetermined mobile device having an ID and received by a radio receiver; and notifying an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit, wherein the step of registering includes: a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group.

According to a third aspect of the present invention, it is provided a computer program executed by a processor of a device operation controller when installed in the processor to perform steps of: registering IDs each included in information transmitted from a predetermined mobile device having an ID and received by a radio receiver; and notifying an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit, wherein the step of registering includes: a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group.

Advantageous Effects of Invention

According to the present invention, even if there are a plurality of users who use the operation target device, it is possible to easily control the operation of the operation target device.

DESCRIPTION OF EMBODIMENTS

Figure 1:
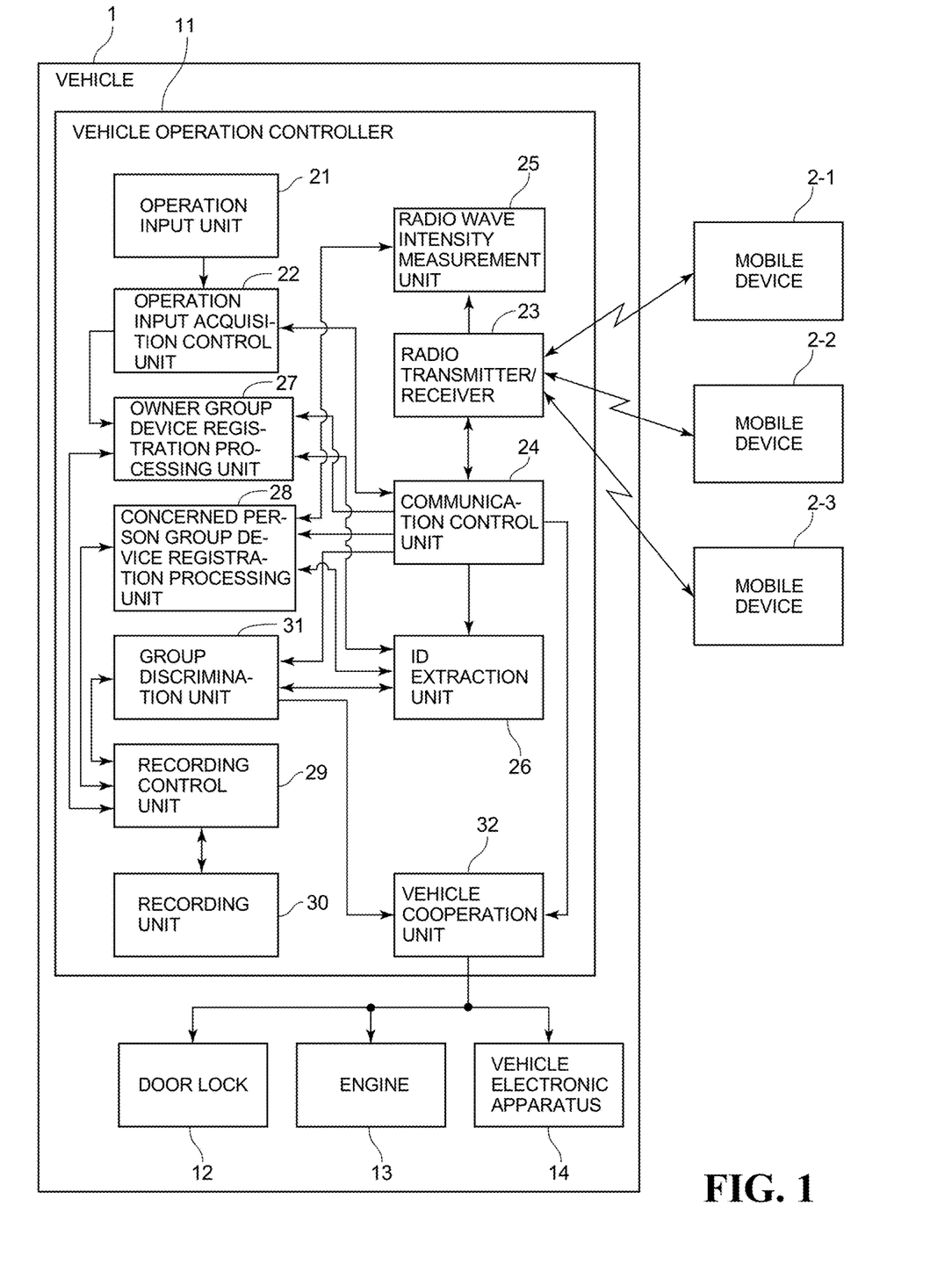
FIG. 1 is a functional block diagram of a vehicle operation controller provided in a vehicle.

A vehicle operation controller according to an embodiment of the present invention will be described hereinafter with reference to FIG. 1 to FIG. 7.
The vehicle operation controller 11 according to the embodiment of the present invention will be described with reference to FIG. 1. The vehicle operation controller 11 is provided inside a vehicle 1. FIG. 1 is a functional block diagram for explaining functions of the vehicle operation controller 11 together with a configuration inside the vehicle 1 related to the functions.
FIG. 1 shows portable devices 2-1 to 2-3 near the vehicle 1, a vehicle operation controller 11 mounted in the vehicle 1, a door lock 12 provided in the vehicle 1, an engine 13, and a vehicle electronic apparatus 14. Although three mobile devices 2-1 to 2-3 are shown here, this number changes depending on the situation at that time, and there may be a case where a larger number of mobile devices exist or a case where none of them exists. Each of the mobile devices 2-1 to 2-3 may be a device having a device-specific ID and having a wireless communication function, such as a smartphone, a mobile phone, or a mobile device. If the mobile devices 2-1 to 2-3 will not be needed to be distinguished, these will be hereinafter collectively referred to as the mobile devices 2. The device-specific ID is an address in a communication system for communicating with the vehicle antitheft device 11, for example, a BD address (Bluetooth Device Address) in Bluetooth (registered trademark), or an ID that can be notified to the vehicle antitheft device 11 in that communication system, such as a telephone number or a MAC (Media Access Control) address. The vehicle operation controller 11 registers any of the mobile devices 2 held by the owner of the vehicle 1 and also presumed a person concerned with the owner of the vehicle 1 to automatically register the mobile device 2 held by the concerned person to execute a process for controlling the operation on the vehicle 1. The vehicle operation controller 11 can control the operation of each device in the vehicle 1 such as the door lock 12, the engine 13, the vehicle electronic apparatus 14 or the like via a CAN (Controller Area Network) in the vehicle 1 or directly if direct control is possible. The vehicle electronic apparatus 14 may include, for example, a car navigation system and a headset.

The vehicle operation controller 11 unlocks the door lock 12 by controlling the door lock 12 via the CAN in the vehicle 1, or sending an instruction to allow the unlocking of the door lock 12 to the ECU (Electronic Control Unit) in the vehicle 1 when, for example, the owner of the vehicle 1 (a person who mainly uses the vehicle 1) or a person concerned with the owner who holds the registered portable device 2 approaches the vehicle in a state that the door is locked. The vehicle operation controller 11 may also instruct the engine start when, for example, the owner of the vehicle 1 or a person concerned with the owner having the registered portable device 2 gets into the vehicle 1 in the state that the engine is off. In addition, the vehicle operation controller 11 controls the vehicle electronic apparatus 14 to instruct for accepting to turn on the power when the owner of the vehicle 1 or a person concerned with the owner having the registered portable device 2 gets into the vehicle 1. The vehicle operation controller 11 can make the usage permission content of the vehicle electronic apparatus 14 different between the owner of the vehicle 1 and a person concerned with the owner. Further, the vehicle operation controller 11 can control to lock the door lock 12 when the owner of the vehicle 1 or a person concerned with the owner having the registered portable device 2 is not exist near the vehicle 1 in a state where the door is unlocked for a certain time or more.

The mobile device 2 is capable of wirelessly communicating with the vehicle operation controller 11. The mobile device 2 may be, for example, a device having a device-specific ID and a wireless communication function, such as a smartphone, a mobile phone, or a mobile device. Any wireless communication system may be used as long as it authenticates with an ID, and a wireless LAN (Local Area Network), Bluetooth, or the like can be used. Hereinafter, it will be described a case where a smartphone is used as the mobile device 2 and communication is performed with the vehicle operation controller 11 using Bluetooth. A smartphone that can communicate using Bluetooth is associated with a BD address which is a unique 48-bit address used to identify a Bluetooth compatible device. In Bluetooth communication, devices execute authentication each other for maintaining security so as not to communicate with an exterior device. A mobile device 2 transmits a BD address for communication with another Bluetooth compatible device. The vehicle operation controller 11 authenticate the BD address issued to connect with the mobile device 2.

In this system, at first, when a mobile device 2 of the owner of the vehicle 1 and the vehicle operation controller 11 are authenticated and connected each other by communication, the mobile device 2 is determined as it is held by the vehicle owner so that the BD address of the mobile device 2 is registered in the vehicle operation controller 11 by the process described below. One or more mobile devices 2 held by the owner of the vehicle 1 can be registered as belonging to an owner group in a registration table described later. For example, when the mobile device 2-1 registered as belonging to the owner group approaches the vehicle 1 and the vehicle operation controller 11 acquires the BD of the mobile device 2-1, the vehicle operation controller 11 controls the vehicle operation permitted by the owner.

When it is detected BD addresses transmitted from other mobile devices 2-2 and 2-3 at the same time the mobile device 2-1 registered as belonging to the mobile device 2 held by the owner of the vehicle 1 being connected, the vehicle operation controller 11 registers the BD addresses of the mobile devices 2-2 and 2-3 as ones of mobile devices held by a person or persons concerned with the owner of the vehicle 1 by the process described later. One or more mobile devices 2 held by the persons concerned with the owners of the vehicle 1 can be registered as belonging to a concerned person group in a registration table described later. When the mobile devices 2-2 and 2-3 registered as the concerned person group approach the vehicle 1 and the vehicle operation controller 11 acquires the BD address of the mobile devices 2 registered as the concerned person group, the vehicle operation controller 11 controls the vehicle operation permitted to the concerned persons.

The vehicle operation controller 11 is configured by functional units including an operation input unit 21, an operation input acquisition control unit 22, a radio transmitter/receiver 23, a communication control unit 24, a radio wave intensity measurement unit 25, an ID extraction unit 26, an owner group device registration processing unit 27, a concerned person group device registration processing unit 28, a recording control unit 29, a recording unit 30, a group discrimination unit 31, and a vehicle cooperation unit 32. Each function of the owner group device registration processing unit 27, the concerned person group device registration processing unit 28, the recording control unit 29, the group discrimination unit 31, the theft determination processing unit 32, and the vehicle cooperation unit 33 is realized by one or more processors. Each processor may be a general-purpose microprocessor that realizes each function by software, or may be an ASIC (Application Specific Integrated Circuit), PLD (Programmable Logic Device), or the like. At least a part of the function of the operation input acquisition control unit 22 may also be realized by at least one of the above-mentioned processors. The functions of the communication control unit 24, the radio wave intensity measuring unit 25, and the ID extracting unit 26 are realized by at least one of the above-mentioned processors or a separate digital signal processor.

The operation input unit 21 includes, for example, input devices such as buttons, keys, and a touch panel, receives an input operated by a user according to a screen display prompting an operation input by the operation input acquisition control unit 22, and supplies the input information to the acquisition control unit 22.

The radio transmitter/receiver 23 transmits and receives radio signals to and from the mobile device 2 under the control of the communication control unit 24. The radio transmitter/receiver 23 supplies the signal received from the mobile device 2 to the communication control unit 24.

The communication control unit 24 controls wireless communication with the mobile device 2 by the radio transmitter/receiver 23. When the information supplied from the radio transmitter/receiver 23 is an operation input to the vehicle anti-theft device 11 by the user, the communication control unit 24 supplies the supplied information to the operation input acquisition control unit 22. The communication control unit 24 also supplies the BD address of the mobile device 2 supplied from the radio transmitter/receiver 23 to the group discrimination unit 31, as well as the owner group device registration processing unit 27 and the concerned person group device registration processing unit 28.

The operation input acquisition control unit 22 receives a user operation input from the operation input unit 21 or the communication control unit 24. When a command for starting the registration process for the mobile device 2 to be registered into the owner group is received as the user's operation input, the operation input acquisition control unit 22 notifies the communication control unit 24 and the owner group device registration processing unit 27 of starting the registration process for the mobile device 2 to be registered into the owner group.

The radio field intensity measuring unit 25 measures the radio field intensity of the mobile device 2 in the wireless communication executed by the radio transmitter/receiver 23 with the mobile device 2, and supplies it to the concerned person group device registration processing unit 28.

The ID extraction unit 26 extracts the ID of the mobile device 2 included in the signal received by the radio transmitter/receiver 23 from the mobile device 2. Here, the ID extraction unit 26 extracts the BD address of the mobile device 2. The mobile device 2 does not need to be communicatively connected to the vehicle anti-theft device 11, and the ID extraction unit 26 may extract all BD addresses transmitted from the mobile devices 2 existing in vicinity of the vehicle anti-theft device 11. The ID extraction unit 26 supplies the extracted BD addresses to the owner group device registration processing unit 27, the concerned person group device registration processing unit 28 and the group discrimination unit 31.

The owner group device registration processing unit 27 executes a process related to registration of the mobile device 2 of the owner group. When it is received a notification of the registration process of the mobile device 2 started, the owner group device registration processing unit 27 acquires the BD address of the mobile device 2, that is authenticated and is connected, from the ID extraction unit 26 and supplies it to the recording control unit 29 so that the BD address is registered in the registration table recorded in the recording unit 30. The registration table will be described later with reference to FIG. 2 and FIG. 4.

The concerned person group device registration processing unit 28 executes a process related to registration of the mobile device 2 into the concerned person group. The concerned person group device registration processing unit 28 acquires the BD address of the mobile device 2 from the ID extraction unit 26 and receives the measured result of the radio field intensity of the mobile device 2 in the wireless communication executed by the radio transmitter/receiver 23 with the mobile device 2, supplied from the radio field intensity measurement unit 25. Consider a case where a plurality of BD addresses are supplied from the ID extraction unit 26, one of the BD addresses being of the mobile device 2-1 which is registered in the owner group and is in connection and another being of the mobile device 2-2 which is not registered in the owner group, that is, where the BD address of the mobile device 2-2 is received during the BD address of the mobile device 2-1 which is registered in the owner group is receive. In such a case, the concerned person group device registration processing unit 28 monitors the radio field intensities of the mobile devices 2-1 and 2-2 in the radio reception, supplied from the radio field intensity measuring unit 25 and determines whether the mobile device 2-2 not registered in the owner group is the mobile device 2 held by the person concerned with the owner. Specifically, when the degree of change in the radio field intensity of the radio wave received from the unregistered mobile device 2-2 is similar with that from the mobile device 2-1 registered in the owner group, the concerned person group device registration processing unit 28 may estimate that the owner of the mobile device 2-2 has approached to the vehicle 1 on foot and boarded the vehicle 1 together with the owner of the mobile device 2-1 registered in the owner group. Therefore, in this case, the owner of the mobile device 2-2 not registered in the owner group can be estimated to be a person concerned with the owner.

Regarding the similarity of the radio field intensity, a large allowance may be taken with respect to time in consideration of a case where the owner of the mobile device 2-1 and the owner of the mobile device 2-2 board the vehicle 1 with a time lag. The same applies when getting off from the vehicle 1. Further, when the degrees of changes in the radio field intensities of the mobile device 2 registered in the owner group and the mobile device 2-2 not registered in the owner group are both less than the predetermined values at the movement of the vehicle being detected by a vehicle movement detector for acquiring the moving state of the vehicle, the owner of the mobile device 2-2 may be determined as in the vehicle with the owner of the vehicle so that the owner of the mobile device 2-2 not registered in the owner group may be presumed as a person concerned with the owner. The vehicle movement detector may use a known technique such as acquisition of a vehicle speed pulse, description thereof will be omitted.

When the mobile device 2-2 is discriminated as held by the concerned person of the owner, the concerned person group device registration processing unit 28 registers the BD address of the mobile device 2-2 in the in the registration table recorded in the recording unit 30 as of a mobile device of the concerned person group. The registration table will be described later with reference to FIG. 2.

In the registration process of the concerned person group, the more stringent the conditions for the judgment based on the radio field strength and the more the number of times set for discriminating the concerned person, the higher the security becomes but the mobile device 2-2 held by the concerned person is less likely to be registered as the mobile device 2 of the concerned person group, which is inferior in practicality. On the other hand, the milder the condition of the judgment by the radio field intensity and the smaller the number of times set for discriminating the concerned person, the faster the automatic registration is performed and the higher the practicality, but the lower the security becomes. That is, with respect to the determination condition based on the radio field intensity and the estimated number of times required to be registered as a concerned person, the most suitable value may be set from the viewpoint of practicality and security. Instead of making a determination based on the radio field intensity, when the BD address of the mobile device 2-2 is received during the BD address of the mobile device 2-1 which is registered in the owner group is receive, it may be determined the mobile device 2-2 as a mobile device of the concerned person group based on the number of times the BD address detected. In this case, it is preferable to increase the number of times of determination as a person concerned, for example, 10 times or more.

The recording control unit 29 registers the information in the registration table recorded in the recording unit 30 based on the information supplied from the owner group device registration processing unit 27 and the concerned person group device registration processing unit 28, or controls information update.

Figure 2:
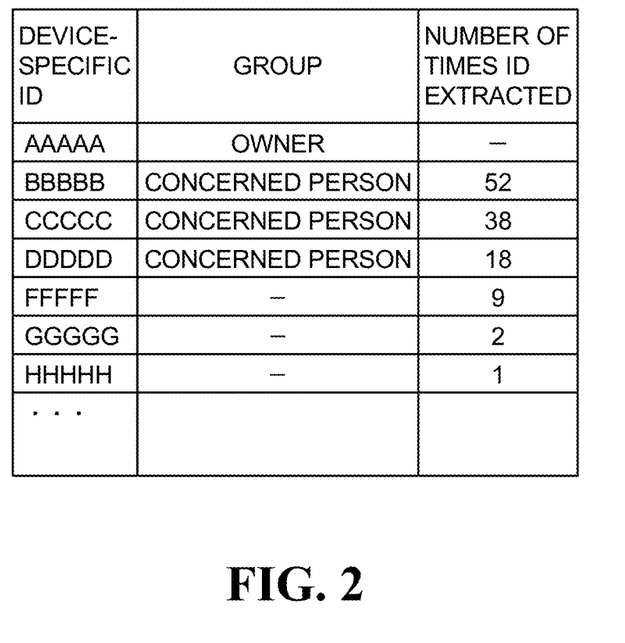
FIG. 2 is a diagram for explaining a registration table.
Figure 3:
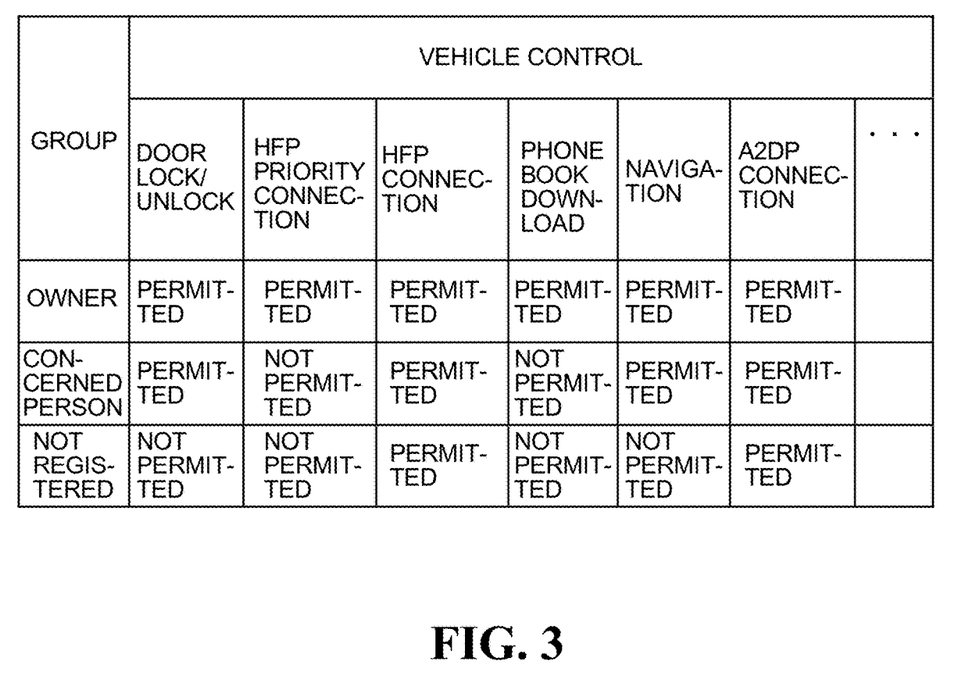
FIG. 3 is a diagram for explaining a controlled operation.

The recording unit 30 records the registration table under the control of the recording control unit 29. In the registration table recorded in the recording unit 30, for example, as shown in FIG. 2, here are registered the BD address of the mobile device 2 registered as the owner group and the BD addresses of the mobile device 2 held by users determined as persons concerned with the owner with the estimated number of times. In this case, as shown in FIG. 3, a table is registered in the group discrimination unit 31 for indicating which control contents of each unit are permitted to the user holding the mobile device 2 of the owner group and the user holding the mobile device 2 of the concerned person group. The recording unit 30 may be a writable nonvolatile memory such as an HDD (Hard Disk Drive) or an SSD (Solid State Drive).

As shown in FIG. 3, the control contents of the vehicle 1 permitted to the user holding the portable device 2 of the owner group and the user holding the portable device 2 of the concerned person group include, for example, unlocking and locking of the door lock 12, and whether the use of the vehicle electronic apparatus 14 such as a car navigation system or a headset is permitted or prohibited. In the use of the headset, permission or prohibition may be set individually for each content of the use. In an example here, the usage content of the headset is set separately for HFP (Hands-Free Profile) priority connection, HFP connection, phone book download, and A2DP (Advanced Audio Distribution Profile) connection. In addition, the control contents of the vehicle 1 permitted to the user holding the portable device 2 of the owner group and the user holding the portable device 2 of the concerned person group may include control contents other than those shown in FIG. 3, for example, starting the engine 13, opening and closing the power window, and the like.

Figure 4:
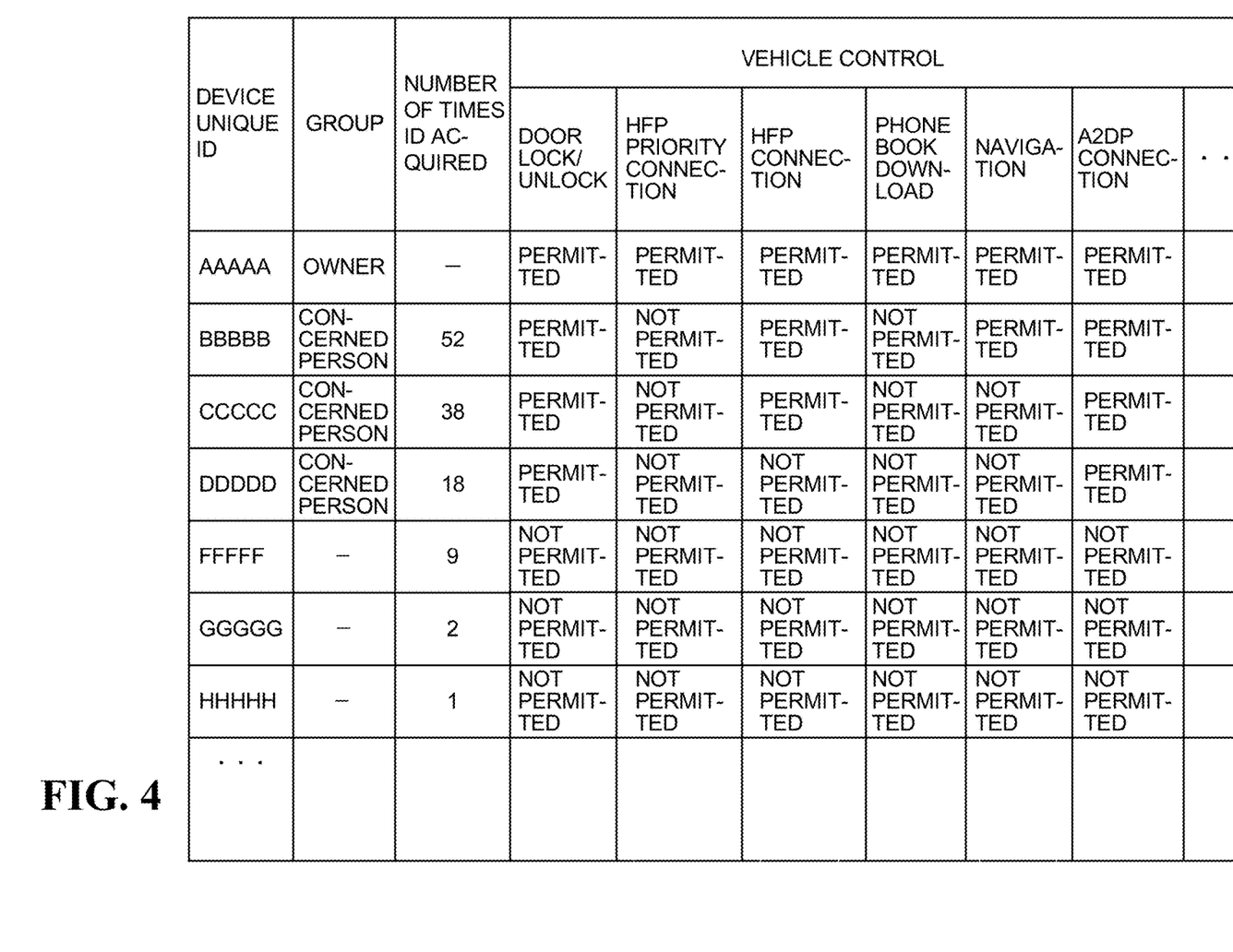
FIG. 4 is a diagram for explaining a registration table.

Further, in the registration table, it may be registered, for example, as shown in FIG. 4, the BD address of the mobile device 2 registered as the owner group, the BD address of the mobile device 2 held by the user who is determined to be a person concerned with owner, and the number of times that the address and the acquired ID (BD address) are determined to be the unique ID of the mobile device 2 held by the person concerned with the owner. It may be also registered additionally in the registration table the control contents of the vehicle 1 permitted to the mobile device 2 of the owner group and that permitted to the mobile device 2 of the concerned person group based on the number of times that the mobile device 2 of the concerned person group is determined to be of the concerned person.

The group discrimination unit 31 refers to the registration table recorded in the recording unit 30 to check whether the mobile device 2 having the BD address extracted by the ID extracting unit 26 is registered as the owner group or the concerned person group, or not registered in any group, and supplies the determination result to the vehicle cooperation unit 32. When the control contents of the vehicle permitted to the user holding the mobile device 2 of the concerned person group are set different depending on the number of times that the ID (BD address) is acquired, the group discrimination unit 31 supplies information of permitted operation contents as a discrimination result to the vehicle cooperation unit 32. In addition, when it has been received no BD address of any mobile device 2 registered as the owner group or the concerned person group for a certain period of time, the group discrimination unit 31 notifies it to the vehicle cooperation unit 32.

The vehicle cooperation unit 32 instructs to an ECU in the vehicle 1 to control each device in the vehicle, such as the door lock 12, the engine 13, the vehicle electronic apparatus 14 and the like based on the group determination result supplied from the group discrimination unit 31 or the information of permitted operation contents, or issues permission to each device in the vehicle 1. In addition, the vehicle cooperation unit 32 execute to control the door of the vehicle so as to be locked when it is received a notification from the group discrimination unit 31 that it has been received neither the BD address of the mobile device 2 registered as the owner group nor that of the mobile device 2 held by the user who is discriminated as a person concerned with the owner for a certain period of time.

As described above, the vehicle operation controller 11 mounted on the vehicle 1 comprises the radio transmitter/receiver 23 receiving information including the ID of the portable device 2 wirelessly transmitted from the portable device 2, the owner group device registration processing unit 27 as a first registration process for registering a first ID received in a predetermined procedure by the radio transmitter/receiver 23 as an ID of the mobile device 2 belonging to the owner group, the concerned person group device registration processing unit 28 as a second registration process for registering a second ID as an ID of the mobile device belonging to the concerned person group, when the second ID is received by the radio transmitter/receiver 23 together with the ID registered in the owner group device registration processing unit 27 by the radio transmitter/receiver 23, and the vehicle cooperation unit 32 for notifying operations on the vehicle 1 being permitted to the vehicle, more precisely the ECU thereof, on a condition where it is receive either the ID registered in the owner group device registration processing unit 27 or the ID registered in the concerned person group device registration processing unit 28 at that time.

Accordingly, the vehicle operation controller 11 can automatically detect a mobile device 2 held by a person concerned with the owner of the vehicle 1 by registering the mobile device 2 held by the owner of the vehicle 1 and easily control operations of the vehicle 1 permitted to the owner of the vehicle 1 or his related persons. The vehicle operation controller 11 can also control the operations of the vehicle 1 with ensuring security by automatically detecting, for example, a mobile device of a family member of the owner of the vehicle 1 and determining it as that of a person concerned with the owner without authentication. On this case, it can be set for the owner to be permitted all of the controls of the vehicle 1, including ON/OFF of the engine 13, and for the concerned person not to be permitted the control of the engine 13, and to be permitted unlocking of the door lock 12 and ON/OFF of the vehicle electronic apparatus 14 so that the control or the range of the control contents can be changed depending on whether the unique ID of the mobile device 2 of the owner is detected or only the unique ID of the mobile device 2 of the concerned person is detected to. Alternatively, the range of control contents to be permitted can be changed to make security robust.

Figure 5:
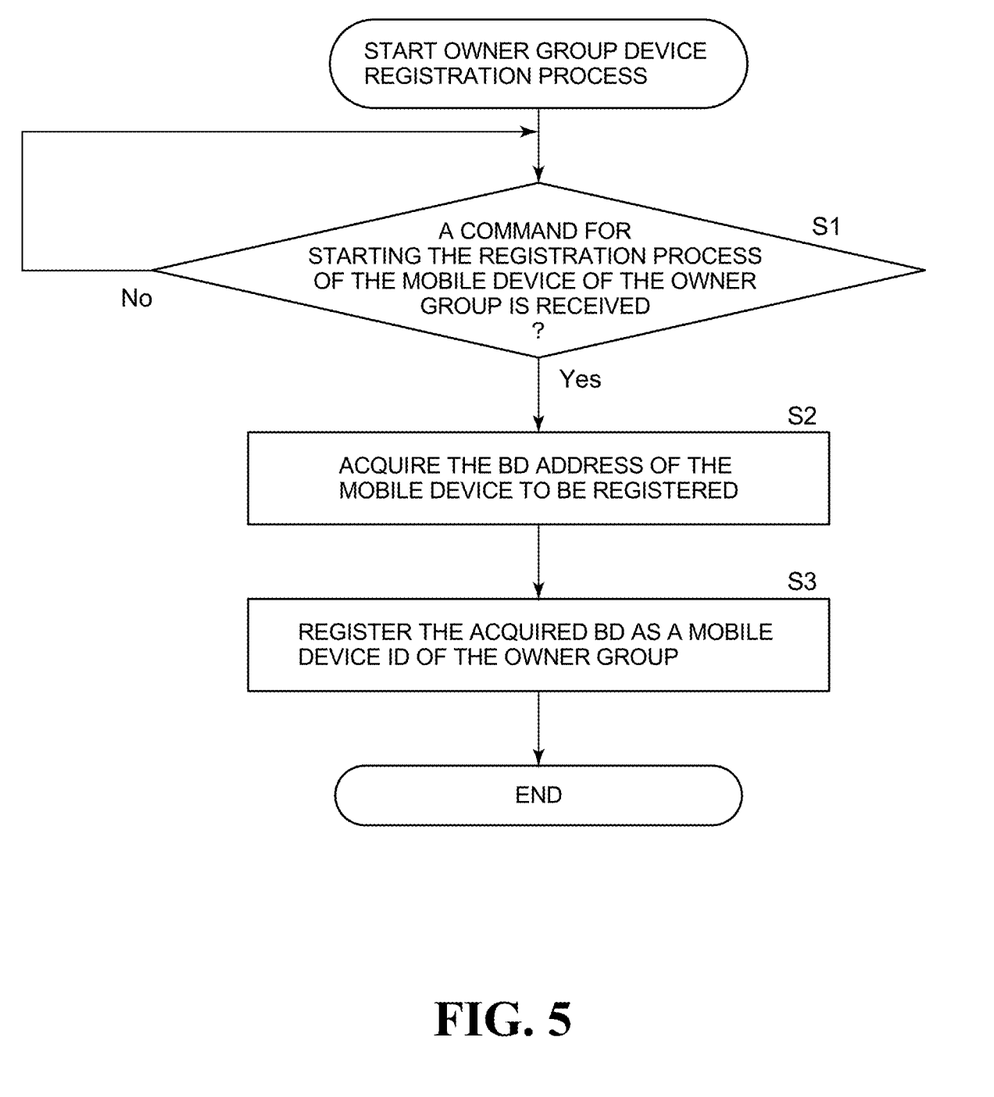
FIG. 5 is a flowchart for explaining an owner group device registration process.

It will now be described an owner group device registration process executed by the vehicle operation controller 11, with reference to the flowchart in FIG. 5.

In step S1, the operation input acquisition control unit 22 determines whether or not a command is received from the operation input unit 21 or the communication control unit 24 for starting registration processing of a mobile device 2 of the owner group. When it is determined in step S1 that the command for starting the registration process of the mobile device 2 of the owner group has not been received, the process of step S1 is repeated until it is determined that the command for starting the registration process is received.

When it is determined in step S1 that the command for starting the registration process of the mobile device 2 of the owner group is received, the operation input acquisition control unit 22 notifies in step S2 the communication control unit 24 and the owner group device registration processing unit 27 of starting the registration process of the mobile device 2 of the owner group. The communication control unit 24 controls the radio transmitter/receiver 23 to acquire the BD address of the mobile device 2 to be registered, and supplies it to the owner group device registration processing unit 27.

In step S3, the owner group device registration processing unit 27 acquires the BD address of the mobile device 2 to be registered from the ID extraction unit 26, and supplies it to the recording control unit 29 to register it in the registration table recorded in the recording unit 30. The recording control unit 29 registers the acquired BD address in the registration table recorded in the recording unit 30 as the unique ID of the mobile device 2 of the owner group, and the process is completed.

By such a process, the BD address of the mobile device 2 of the owner group is registered in the vehicle operation controller 11. It has been assumed that the owner group device registration process is performed in parallel with other processes, and the process is looped until there is a command for starting the registration process. Alternatively, step S1 may be made as a higher-level process so as to start the processing shown in FIG. 3 from step S2 after receiving the command for the group device registration process.

Figure 6:
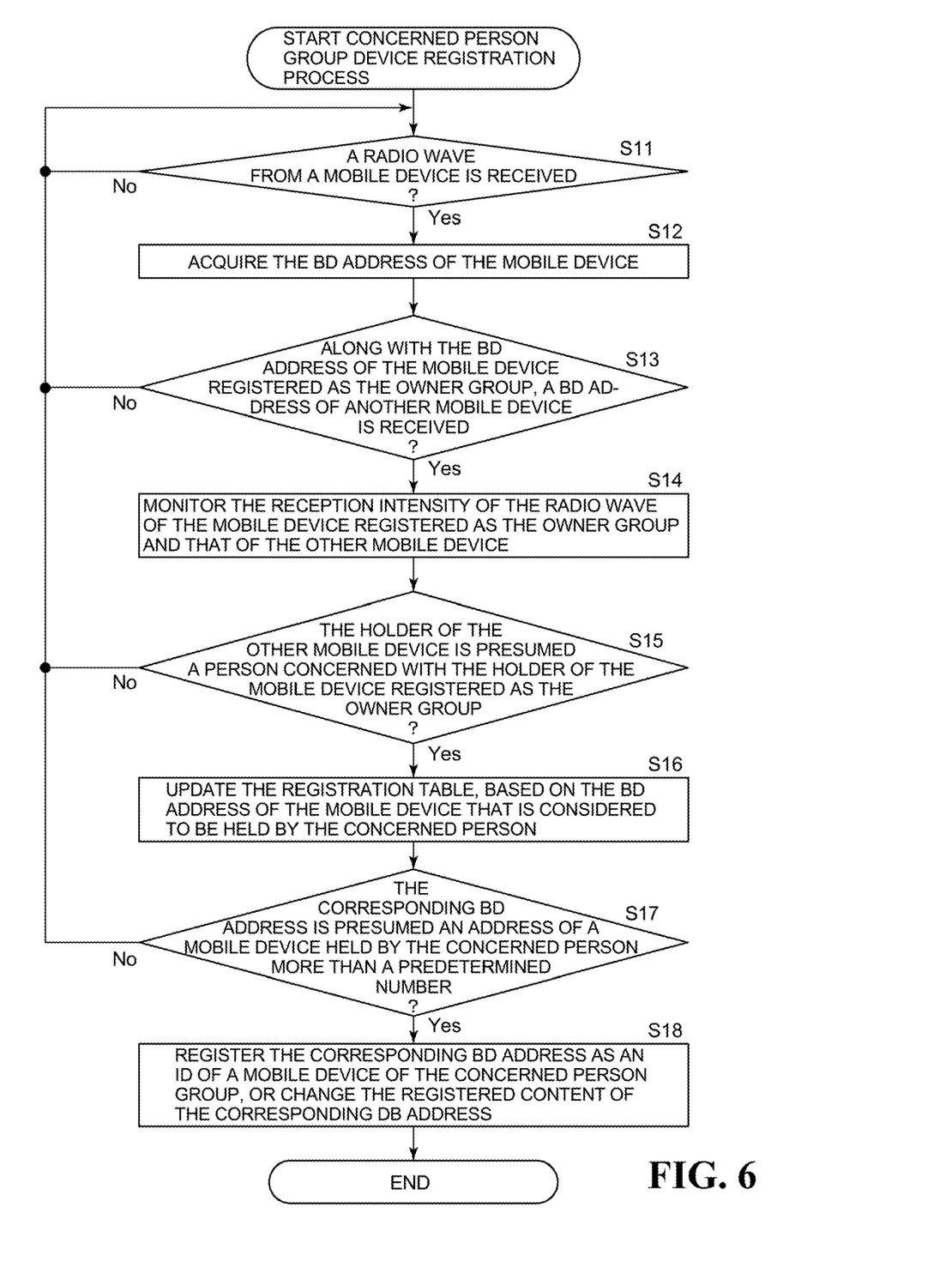
FIG. 6 is a flowchart for explaining a concerned person group device registration process.

A concerned person group device registration process executed by the vehicle operation controller 11 will be described with reference to the flowchart in FIG. 6.

In step S11, the communication control unit 24 determines whether the radio transmitter/receiver 23 has received a radio wave of any mobile device 2. When it is determined in step S11 that no radio wave of any mobile device 2 is received, the process of step S11 is repeated until it is determined that a radio wave of any mobile device 2 is received.

When it is determined in step S11 that radio waves of mobile devices 2 have been received, the ID extraction unit 26 is controlled by the communication control unit 24 in step S12 to extract BD addresses which are ID addresses of the mobile devices 2 received on communicating between the radio transmitter/receiver 23 and the mobile devices 2 and to supply these to the concerned person group device registration processing unit 28 and the group discrimination unit 31.

In step S13, the concerned person group device registration processing unit 28 determines whether the BD address of the mobile device 2 registered as the owner group with that of another mobile device 2 based on the BD address supplied from the ID extraction unit 26. When it is determined in step S13 that the BD address of the mobile device 2 registered as the owner group and an BD address of another mobile device 2 are not received, the process returns to step S11, and the subsequent processes are repeated.

If it is determined in step S13 that the BD address of the mobile device 2 registered as the owner group and that of the other mobile device 2 are received, the concerned person group device registration processing unit 28 monitors the reception intensity of the radio wave of the mobile device 2 registered as the owner group and that of the other mobile device 2 based on the radio field intensities of the mobile devices 2 in the wireless communication executed by the radio transmitter/receiver 23 with the mobile devices 2, which is supplied from the radio field intensity measuring unit 25.

In step S15, the concerned person group device registration processing unit 28 determines whether or not the holder of the other mobile device 2 can be presumed a person concerned with the holder of the mobile device 2 registered as the owner group, based on whether or not the changes in the reception intensity of the radio wave of the mobile device 2 registered as the owner group is substantially same with that of the other mobile device 2. When it is determined in step S15 that the holder of the other mobile device 2 cannot be presumed to be the person concerned with the holder of the mobile device 2 registered as the owner group, the process returns to step S11, and the subsequent processes are repeated.

In the above-mentioned process, the more the condition of the determination based on the radio field intensity is severe, the higher the security becomes. However, it becomes harder to register the BD address of the mobile device 2 actually held by the concerned person of the owner as a BD address of an mobile device 2 in the concerned person group. This is less practical. Therefore, the determination condition based on the radio field intensity may be set as appropriate depending on the balance between security required by the user and practicality.

If it is determined in step S15 that the holder of the other mobile device 2 can be presumed to be a concerned person of the holder of the mobile device 2 registered as the owner group, the concerned person group device registration processing unit 28 controls in step S16 the recording control unit 29 to update the registration table recorded in the recording unit 30, based on the BD address of the mobile device 2 that is considered to be held by the concerned person.

In step S17, the concerned person group device registration processing unit 28 refers to the registration table recorded in the recording unit 30 via the recording control unit 29, and determines whether or not the corresponding BD address is presumed an address of a mobile device 2 held by the concerned person more than a predetermined number, more than one, of times for registering it as the concerned person group. When it is determined in step S17 that it is not regarded as the BD address of the mobile device 2 held by the concerned person more than the predetermined number of times, the process returns to step S11, and the subsequent processes are repeated.

In the above-mentioned process, the larger the predetermined number of times for determining that the relevant mobile device 2 is the mobile device 2 held by the person concerned with the owner of the vehicle 1 is, the higher the security becomes. However, it becomes harder to register the BD address of the mobile device 2 actually held by the concerned person of the owner as a BD address of an mobile device 2 in the concerned person group. This is less practical. Therefore, the number of times may be appropriately set depending on the balance between security required by the user and practicality.

When it is determined in step S17 that it is presumed as the BD address of the mobile device 2 held by the concerned person a predetermined number of times or more, the concerned person group device registration processing unit 28 newly registers in step 18 the corresponding BD address as an ID of a mobile device 2 of the concerned person group, or change the registered content of the corresponding DB address, that is, the number of times that the mobile device 2 held by the concerned person has been presumed, and then the process ends.

According to the above-mentioned process, in the vehicle anti-theft device 11, the BD address of the mobile device 2 held by the person concerned with the owner of the vehicle 1 is automatically detected and recorded based on whether or not it is similar to the degree of change in strength in the radio field intensity of the radio wave received from the unregistered mobile device 2 is similar to that of the mobile device 2 registered in the owner group. Then, the BD address of the mobile device 2 of the person concerned with the owner of the vehicle 1 is automatically registered based on the number of times of detection. Further, at this time, the strictness of the determination condition based on the radio field intensity and the presumed number of times required for registration may be appropriately set depending on the balance between security required by the user and practicality. In addition, in this embodiment, it is assumed that the concerned person group device registration process is performed in parallel with other processes and the loop is performed until the radio wave of the mobile device is received. Alternatively, step S11 may be made as a higher-level process so as to start the processing shown in FIG. 6 from step S12 after receiving the radio wave.

Figure 7:
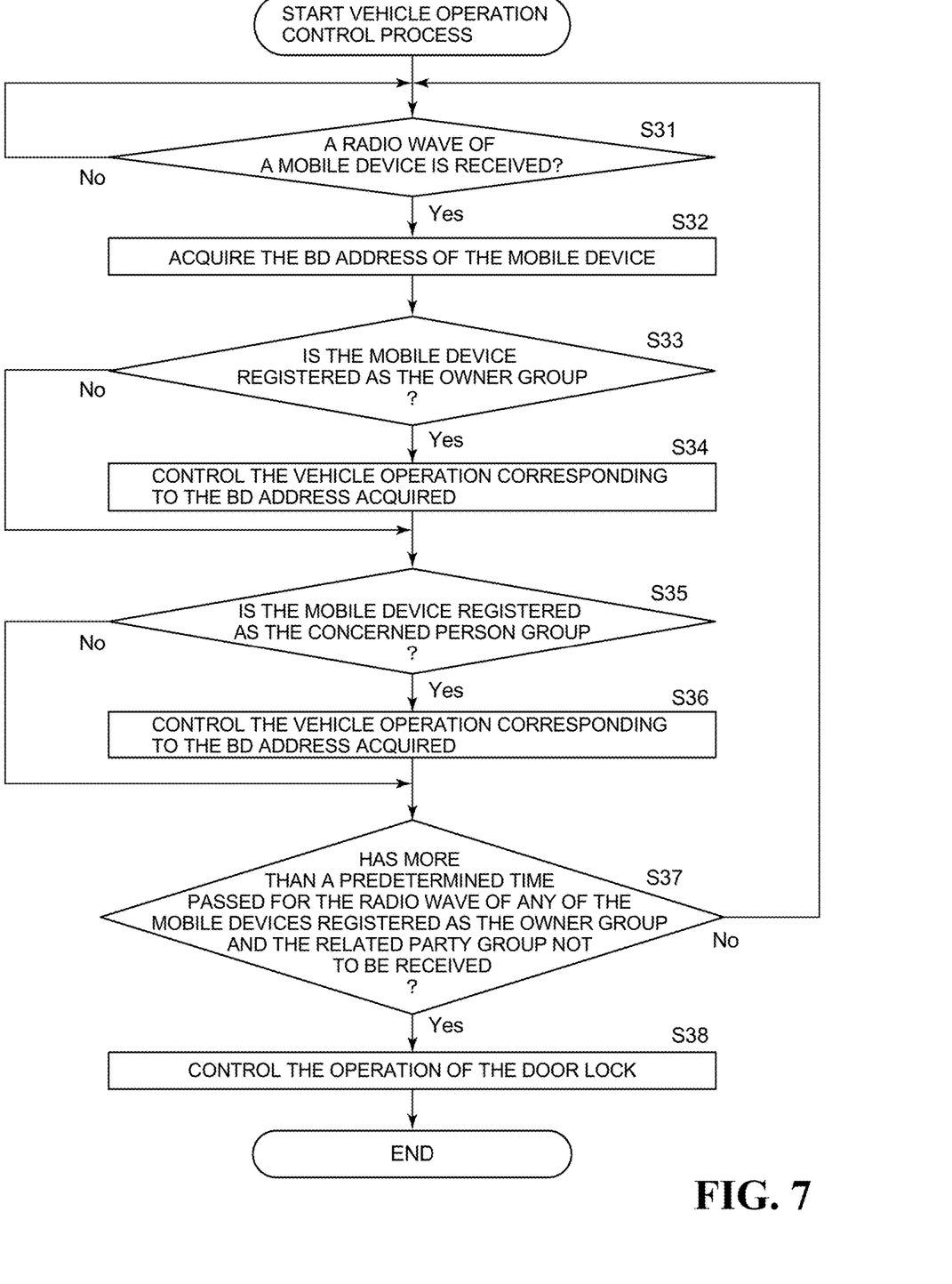
FIG. 7 is a flowchart for explaining vehicle operation control process.

A vehicle operation control process executed by the vehicle operation controller 11 will be described with reference to the flowchart in FIG. 7.

In step S31, the communication control unit 24 determines whether the radio transmitter/receiver 23 has received the radio wave of a mobile device 2. When it is determined in step S31 that no radio wave of any mobile device 2 is received, the process of step S31 is repeated until it is determined that a radio wave of a mobile device 2 is received.

When it is determined in step S31 that a radio wave of a mobile device 2 is received, the ID extracting unit 26 controls the communication control unit 24 in step S32 to extract the BD address, which is the ID of the mobile device 2 received on communicating of the radio transmitter/receiver 23 and the mobile device 2, and to supply to the concerned person group device registration processing unit 28 and the group discrimination unit 31. Herein, the BD address extracted by the ID extraction unit 26 is not limited to one and may be plural.

In step S33, the group discrimination unit 31 refers to the registration table recorded in the recording unit 30 via the recording control unit 29, and determine whether the mobile device 2 having the BD address acquired in step S32 (if a plurality of BD addresses has been acquired, any one of these addresses) is the mobile device 2 registered as the owner group or the concerned person group. When it is determined in step S33 that the mobile device 2 is not registered as the owner group, the process proceeds to step S35 described later.

When it is determined in step S33 that the mobile device 2 is registered as the owner group, the group discrimination unit 31 supplies in step S35 a determination result and information indicating the permitted operation contents to the vehicle cooperation unit. The vehicle cooperation unit 32 notifies vehicle control operations corresponding to the BD address acquired in step S32, that is, the vehicle control operations permitted to the owner of the portable device 2 registered as the owner group, to the ECU in the vehicle 1.

When it is determined in step S33 that the portable device 2 is not registered as the owner group, or after the process in step S34 ends, the group discrimination unit 31 refers in step 35 to the registered registration table via the recording control unit 29 and determine whether the mobile device 2 having the BD address (in the case where there are a plurality of acquired BD addresses, one of the BD addresses) acquired in step S32 is registered as the concerned person group. If it is determined the mobile device 2 is not registered as the concerned person group, the process proceeds to step S37 described later.

When it is determined in step S35 that the mobile device 2 is registered as the concerned person group, the group discrimination unit 31 supplies a determination result and information indicating the permitted operation contents to the vehicle cooperation unit 32 in step S36. The vehicle cooperation unit 32 notifies the vehicle control operation corresponding to the BD address acquired in step S32, that is, the vehicle control operation permitted by the owner of the portable device 2 registered as the concerned person group to the ETC in the vehicle.

When it is determined in step S35 that the mobile device 2 is not registered as the concerned person group, or after the processing of step S36 is completed, the group discrimination unit 31 determines in step S37 whether or not the state in which no radio wave of any of the mobile devices 2 registered as the owner group or the concerned person group is received has continued for a predetermined time or more. When it is determined in step S37 that the radio wave of any of the mobile devices 2 registered as the owner group and the related party group is not received for the predetermined time or longer, the process returns to step S31 and the subsequent processing is repeated.

When it is determined in step S37 that no radio wave of any of the mobile devices 2 registered as the owner group or the related party group is not received, the group discrimination unit 31 notifies in step S38 to the vehicle cooperation unit 32 that no BD address has been received from the registered portable devices 2 for a certain period of time. The vehicle cooperation unit 32 controls the operation of the door lock 12 to lock it based on the notification from the group discrimination unit 31, and the process ends.

According to the above mentioned process, in the vehicle operation controller 11, all users who use the vehicle 1 can control the predetermined operations of the vehicle 1 based on the IDs or BD addresses of the mobile devices 2 registered as the owner group or the concerned person group, without the users having, for example, a small transmitter of the keyless entry system or a portable device of the smart entry system, or all mobile devices 2 own by the users.

The present invention is not limited to the above-mentioned embodiment, and various modifications can be made can be made within the scope of the present invention. Although it has been described the embodiment of the present invention as a vehicle device mounted on the vehicle, the present invention is not limited to such a vehicle device. This invention may be used, for example, as a controller installed in a house for controlling operations of a door lock, a lighting, an air conditioner, and the like. In this case, for example, mobile devices held by the parents are registered as an owner group, and a mobile device or mobile devices held by a child or children is/are registered as a concerned person group. As a result, it is possible to set that the person who owns the portable device of the concerned person group is not allowed to control operations of devices such as a stove that is in danger of fire. Similarly, it may be used when the security permission level is changed between an employee and a visitor in an office or the like.

The invention claimed is:

1. A device operation controller comprising:
   a radio receiver for receiving information including an ID of a mobile device wirelessly transmitted from the mobile device;
   a radio wave intensity measurement unit for measuring the intensity of the radio wave received from the mobile device;
   a first registration processing unit for registering a first ID received by the radio receiver in a predetermined procedure as an ID of a mobile device belonging to an owner group;
   a second registration processing unit for registering a second ID received by the radio receiver together with the ID of the mobile device belonging to the owner group registered in the first registration processing unit as an ID of a mobile device belonging to a concerned person group; and
   an operation target cooperation unit for executing an operation permission notification process to notify an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit;
   wherein the second registration processing unit is configured to register the second ID as an ID of a mobile device belonging to the concerned person group when the degree of change in the reception radio wave intensity from the mobile device having the second ID is similar to that from a mobile device belonging to the owner group.

2. The device operation controller according to claim 1, wherein the second registration processing unit is configured to register the second ID as an ID of a mobile device belonging to the concerned person group when the number of times the degree of change in the reception radio wave intensity from the mobile device having the second ID being similar to that from a mobile device belonging to the owner group.

3. The device operation controller according to claim 1, wherein the operation target cooperation unit is configured to notify the operation target device a different operation permitted to the operation target device according to whether the ID of the mobile device received at that time is one registered in the first registration processing unit or another registered in the second registration processing unit.

4. The device operation controller according to claim 1, wherein the controller is provided in the vehicle, and the second registration processing unit is configured to register the second ID as an ID of a mobile device belonging to the concerned person group when a movement of the vehicle is detected and both of the degree of change in the reception radio wave intensity from a mobile device belonging to the owner group and that from the mobile device having the second ID are smaller than a predetermined value.

5. A device operation control method including steps of:
   registering IDs each included in information transmitted from a predetermined mobile device having an ID and received by a radio receiver;
   measuring the intensity of the radio wave received from the mobile device; and notifying an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit, wherein the step of registering includes:

a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group and the degree of change in the reception radio wave intensity from the mobile device having the second ID being similar to that from a mobile device belonging to the owner group.

6. A computer program executed by a processor of a device operation controller when installed in the processor to perform steps of:

registering IDs each included in information transmitted from a predetermined mobile device having an ID and received by a radio receiver;

measuring the intensity of the radio wave received from the mobile device; and notifying an operation target device that an operation on the operation target device is permitted, on a condition where it is received either an ID of a mobile device belonging to the owner group device registered in the first registration processing unit or an ID of a mobile device belonging to the concerned person group device registered in the second registration processing unit, wherein the step of registering includes:

a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group and the degree of change in the reception radio wave intensity from the mobile device having the second ID being similar to that from a mobile device belonging to the owner group.

* * * * *